(12) United States Patent
Shen et al.

(10) Patent No.: US 12,007,902 B2
(45) Date of Patent: Jun. 11, 2024

(54) CONFIGURABLE MEMORY SYSTEM AND MEMORY MANAGING METHOD THEREOF

(71) Applicant: ANDES TECHNOLOGY CORPORATION, Hsinchu (TW)

(72) Inventors: Chih-Ming Shen, Hsinchu (TW); Cheng-Yen Huang, Hsinchu (TW)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 85 days.

(21) Appl. No.: 17/984,189

(22) Filed: Nov. 9, 2022

(65) Prior Publication Data

US 2024/0152463 A1    May 9, 2024

(51) Int. Cl.
*G06F 12/00*    (2006.01)
*G06F 12/10*    (2016.01)

(52) U.S. Cl.
CPC ...... *G06F 12/10* (2013.01); *G06F 2212/1024* (2013.01)

(58) Field of Classification Search
CPC .................. G06F 12/10; G06F 2212/1024
USPC ........................................................ 711/202
See application file for complete search history.

(56) References Cited

U.S. PATENT DOCUMENTS

| | | |
|---|---|---|
| 5,237,669 A | 8/1993 | Spear et al. |
| 5,459,869 A | 10/1995 | Spilo |
| 2018/0349268 A1 | 12/2018 | Okada et al. |
| 2019/0227938 A1* | 7/2019 | Gopalakrishnan ............ G06F 12/0868 |
| 2023/0129363 A1* | 4/2023 | Wei ........................ G06F 3/0611 711/103 |

FOREIGN PATENT DOCUMENTS

| | | |
|---|---|---|
| CN | 110494851 | 11/2019 |
| CN | 113590612 | 11/2021 |
| TW | 200604795 | 2/2006 |
| TW | 201437802 | 10/2014 |
| TW | 202038245 | 10/2020 |

OTHER PUBLICATIONS

"Office Action of Taiwan Counterpart Application", issued on Oct. 11, 2023, p. 1-p. 5.

* cited by examiner

*Primary Examiner* — Mardochee Chery
(74) *Attorney, Agent, or Firm* — JCIPRNET

(57) ABSTRACT

The invention provides a configurable memory system including an interface layer, an overlay application layer, and a memory relocatable layer. The interface layer has a physical memory attribute module and a physical memory protection module. The interface layer manages memory attributes and memory security. The overlay application layer is coupled to the interface layer and executes an exception handler process to check if an overlay exception has occurred. The memory relocatable layer, coupled to the interface layer and the overlay application layer, having a plurality of resident service program within a first memory space, an overlay physical region within a second memory space, and a plurality of overlay virtual regions having application processes within a third memory space. The application processes of one of the overlay virtual regions is determined to be executed by the PMA module and is copied from the overlay virtual region to the overlay physical region by a processor.

20 Claims, 7 Drawing Sheets

```
Unhandled Trap : mcause = 0x1, mepc = 0x10000
/* Enter overlay0 function */
Unhandled Trap : mcause = 0x1, mepc = 0x11000
/* Enter overlay1 function */
Unhandled Trap : mcause = 0x1, mepc = 0x13000
/* Enter overlay3 function */
/* Enter overlay3 function */
/* Enter overlay3 function */
Unhandled Trap : mcause = 0x1, mepc = 0x12000
/* Enter overlay2 function */
Unhandled Trap : mcause = 0x1, mepc = 0x13000
/* Enter overlay3 function */
/* Enter overlay3 function */
Unhandled Trap : mcause = 0x1, mepc = 0x12000
/* Enter overlay2 function */
Unhandled Trap : mcause = 0x1, mepc = 0x13000
/* Enter overlay3 function */
Unhandled Trap : mcause = 0x1, mepc = 0x11000
/* Enter overlay1 function
```

FIG. 6

CONFIGURABLE MEMORY SYSTEM AND MEMORY MANAGING METHOD THEREOF

BACKGROUND

Field of the Invention

The invention relates to a memory system, and is further directed to a configurable memory system and memory managing method thereof.

Description of Related Art

Recently, electronic apparatus with powerful processor is necessary for human's life. For improving efficiency of the processor, a configurable memory is necessary for the processor.

In a processor system, for accessing a small amount of data rapidly, the processor in conventional art, however, uses a large amount of overlay regions of the random-access memory. The idling overlay regions of the random-access memory not only leads to the waste of memory space but generates an undesirable memory cost. On the other hand, storing unnecessary programs or processes in the overlay region of the random-access memory is going to slowdown the access speed of memory as well.

What is needed is a processor with a configurable memory system that offers the performance advantages of flexibility and convenience for the programming design but consumes less power and memory cost.

SUMMARY OF THE INVENTION

The invention is directed to a processor and a configurable memory system and method for memory attributing flexibility by relocating the memory address.

Although the high-speed static random-access memory (SRAM) comes at a considerable cost, however, only one overlay region of the SRAM needs to be reserved by using configurable memory method in the present disclosure. When the processor or the memory system is under execution, the code in the selected overlay region is able to be copied from a plurality of overlay regions of read only memory (ROM) to the corresponding overlay region of the SRAM according to the user demand, for instance, the error code overlay application.

The invention provides a configurable memory system including an interface layer, an overlay application layer, and a memory relocatable layer. The interface layer has a physical memory attribute module and a physical memory protection module. The interface layer manages memory attributes and memory security. The overlay application layer is coupled to the interface layer and executes an exception handler process to check if an overlay exception has occurred. The memory relocatable layer, coupled to the interface layer and the overlay application layer, having a plurality of resident service program within a first memory space, an overlay physical region within a second memory space, and a plurality of overlay virtual regions having application processes within a third memory space. The application processes of one of the overlay virtual regions is determined to be executed by the PMA module and is copied from the overlay virtual region to the overlay physical region by a processor.

The present disclosure provides a memory managing method. The memory managing method includes: providing a first signal to an interface layer upon switching a first overlay region to a second overlay region, shifting to an overlay application layer, executing an exception handler process of the application layer to check if an overlay exception has occurred, translating a first address of the second overlay region in a memory relocatable layer into a second address of the second overlay region in the memory relocatable layer, copying application processes of the second overlay region from one of plurality of overlay virtual regions of the memory relocatable layer to an overlay physical region of the memory relocatable layer by a processor, and determining to execute the second overlay region by the PMA module. The interface layer includes a physical memory attribute (PMA) module and a physical memory protection (PMP) module. The interface layer is responsible for managing a plurality of memory attributes and memory security. The overlay physical region receives the application processes from one overlay virtual region at a time.

According to the above descriptions, present disclosure provides a configurable memory system and memory managing method to reduce considerable time cost in writing code about memory space configuration.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 illustrates a schematic diagram of the program of the Exception Handler according to the embodiment of present disclosure.

DETAILED DESCRIPTION OF DISCLOSED EMBODIMENTS

Figure 1:
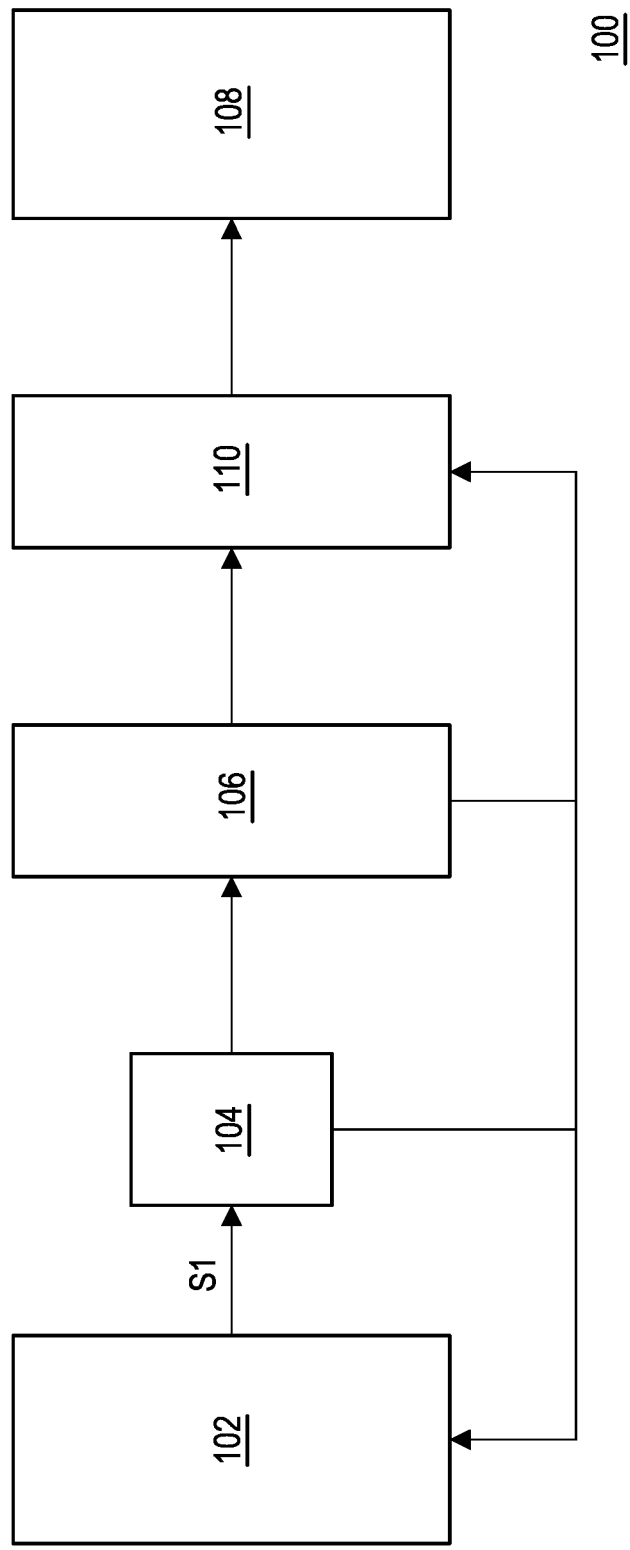
FIG. 1 illustrates a block diagram of a configurable memory system according to an embodiment of present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

In addition, terms, such as "first", "second", "third", "fourth" and the like, may be used herein for ease of description to describe similar or different element(s) or feature(s) as illustrated in the figures, and may be used interchangeably depending on the order of the presence or the contexts of the description.

FIG. 1 illustrates a block diagram of a configurable memory system according to an embodiment of present disclosure.

Please refer to FIG. 1, the configurable memory system includes a data layer 102, an interface layer 104, an overlay application layer 106, a memory relocatable layer 108, and a processor 110.

In accordance with some embodiments of the disclosure, the data layer 102 includes multiple overlay regions (not shown), wherein each overlay regions contains corresponding application processes or programs. In some embodiments, the data layer 102 may be a database, an application program library, etc.

In accordance with some embodiments of the disclosure, the interface layer 104, for example, may be an overlay hardware software interface (HSI), a programmers' view interface, or a user interface. The interface layer 104 includes a physical memory attribute (PMA) module or a physical memory protection (PMP) module. The interface layer 104 is able to manage or control the memory attributes and the memory security. In some embodiments, the interface layer 104 is responsible for the physical memory management. In some embodiments, the interface layer 104 is a independent hardware and software interface. In some embodiments, the interface layer 104 is responsible for setting the interface protocol of the control register and the status register, wherein the control register and the status register may be used by the corresponding software.

In accordance with some embodiments of the disclosure, the physical memory map for a complete system includes various address ranges, some corresponding to memory regions, some to memory-mapped control registers, and some to empty holes in the address space. Some memory regions might not support reads, writes, or execution; some might not support subword or subblock accesses; some might not support atomic operations; and some might not support cache coherence or might have different memory models. Similarly, memory-mapped control registers vary in their supported access widths, support for atomic operations, and whether read and write accesses have associated side effects. In RISC-V systems, these properties and capabilities of each region of the machine's physical address space are termed PMAs.

Memory locations may have various attributes associated with them, and are basically categorized into either one of the two types: device region and memory region. While memory regions may be cacheable or non-cacheable locations, device regions are non-cacheable locations where accesses to these locations may cause side effects.

In some embodiments, there are two mechanisms for PMA module: static PMA and programmable PMA. In some embodiments, for static PMA, at least 16 device regions could be statically configured in the processor through the device region configuration options. However, the number of device regions are not limited thereto. In some embodiments, PMA module is programmable and allows dynamic adjustment of memory attributes in the runtime. In some embodiments, it contains a configurable amount of PMA entries implemented as control and status (CSR) registers to control the attributes of memory locations in interest. If the settings in those entries conflict with the static device region settings, PMA entries will have higher priorities. In some embodiments, PMA entries are statically prioritized. The lowest-numbered PMA entry that matches any physical address (PA) of the access determines the attribute type. If no PMA entries match the address, the attribute type is determined by the statically configured PMA.

In accordance with some embodiments of the disclosure, PMAs are inherent properties of the underlying hardware and rarely change during system operation. PMAs do not vary by execution context. The PMAs of some memory regions are fixed at chip design time, for example, for an on-chip ROM. Others are fixed at board design time, depending, for example, on which other chips are connected to off-chip buses. Off-chip buses might also support devices that could be changed on every power cycle (cold pluggable) or dynamically while the system is running (hot pluggable). Some devices might be configurable at run time to support different uses that imply different PMAs, for example, an on-chip scratchpad RAM might be cached privately by one core in one end-application, or accessed as a shared non-cached memory in another end-application.

In some embodiments, most systems will require that at least some PMAs are dynamically checked in hardware later in the execution pipeline after the physical address is known, as some operations will not be supported at all physical memory addresses, and some operations require knowing the current setting of a configurable PMA attribute. While many other systems specify some PMAs in the virtual memory page tables and use the translation lookaside buffer (TLB) to inform the pipeline of these properties, this approach injects platform-specific information into a virtualized layer and can cause system errors unless attributes are correctly initialized in each page-table entry for each physical memory region. In addition, the available page sizes might not be optimal for specifying attributes in the physical memory space, leading to address-space fragmentation and inefficient use of expensive TLB entries.

In some embodiments, for RISC-V architecture, the specification and checking of PMAs has been separated into a separate hardware structure, the PMA checker. In many cases, the attributes are known at system design time for each physical address region, and can be hardwired into the PMA checker. Where the attributes are runtime configurable, platform-specific memory-mapped control registers can be provided to specify these attributes at a granularity appropriate to each region on the platform (e.g., for an on-chip SRAM that can be flexibly divided between cacheable and uncacheable uses). PMAs are checked for any access to physical memory, including accesses that have undergone virtual to physical memory translation.

In some embodiments, the processors 110 may support to trap physical memory accesses that fail PMA checks. In some embodiments, precisely trapped PMA violations manifest as load, store, or instruction-fetch access exceptions, distinct from virtual memory page-fault exceptions.

In accordance with some embodiments of the disclosure, PMAs must also be readable by software to correctly access certain devices or to correctly configure other hardware components that access memory, such as DMA modules. In some embodiments, PMAs are tightly tied to a given physical platform's organization, as is the means by which software can learn the PMA values for a platform. In some embodiments, the configuration string can encode PMAs for on-chip devices and might also describe on-chip controllers for off-chip buses that can be dynamically interrogated to discover attached device PMAs.

In some embodiments, the machine-mode code of the memory system 100 will extract PMAs and present the information to higher-level less-privileged software.

In some embodiments, the configurable memory system 100 support dynamic reconfiguration of PMAs. The memory system 100 provides an interface to set the attributes by passing requests to a machine-mode driver that can correctly reconfigure the memory system 100. For example, switching cacheability attributes on some memory regions (or overlay regions), such as cache flushes, are available to the machine-mode.

In accordance with some embodiments of the disclosure, the overlay application layer 106 is coupled to the interface layer. The overlay application layer 106 is able to execute an exception handler process to check if an overlay exception has occurred. In some embodiments, the overlay application layer 106 is able to implement the management APIs related to the overlay trap handler. In some embodiments, the exception handler process is composed of the software code. In some embodiments, the exception handler process includes a detection software which is used to determine if the system anomaly is caused by overlay swapping (i.e., the system anomaly occurs at the switching between the two programs).

In accordance with some embodiments of the disclosure, the configurable memory system uses MTYP (memory type attribute) instructions (four bits, [5:2]) to define the cacheability and idempotency of memory regions. In some embodiments, when the value of PMA is set as "15" (i.e., the empty hole region), the MTYP is able to trigger overlay region swapping. That is, when the value of PMA is set as "15", the PMA is able to execute the overlay swapping application and the attribute setting of the memory address. In detail, upon the currently executing process (or programs) in one overlay region shift to the upcoming process in another overlay region, the region "15" of the PMA will be triggered by a request signal for overlay region swapping. Then the currently executing process will jump to the exception handler region, while the detection software embedded in the exception handler region will issue a fault message and check the exception state to determine if the upcoming process will be updated from ROM to RAM (e.g., SRAM or DRAM). For example, when the PMA enters region "15" during the instruction fetch process (i.e., the upcoming process is within an instruction memory overlay), the detection software in the exception handler region will issue an instruction access fault. For another example, when the PMA enters region "15" during the load instruction access process (i.e., the upcoming process is within a data memory overlay), the detection software will issue a load access fault. On the other hand, when the PMA enters region "15" during the store instruction access process (i.e., the upcoming process is within a data memory overlay), the detection software will issue a store access fault.

In accordance with some embodiments of the disclosure, a memory relocatable layer 108 is coupled to the interface layer 104, the overlay application layer 106, and the processor 110.

In some embodiments, the processor 110 may be a central processing unit (CPU), an application processor, hardware accelerators, and/or on a remote cluster based on compute requirements of a client computing system and/or a particular use-case.

In some embodiments, the processor 110 may be parallel processors such as general-purpose graphic processing units (GPGPUs) played a significant role in the practical implementation of deep neural networks. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency.

In some embodiments, the processor 110 may be a graphics processor. The graphics processor typically implements processing techniques such as pipelining that attempt to process, in parallel, as much graphics data as possible throughout the different parts of the graphics pipeline. Parallel graphics processors with SIMT architectures are designed to maximize the amount of parallel processing in the graphics pipeline. In an SIMT architecture, groups of parallel threads attempt to execute program instructions synchronously together as often as possible to increase processing efficiency.

In some embodiments, the processor 110 may be microprocessors, and associated instruction set architecture that, when executed by the processor or other processing logic, perform loading, storing, logical, mathematical, or other functional operations. In particular, the disclosure relates to instructions and logic to interrupt and resume paging in secure enclaves.

In some embodiments, the processor 110 may be a digital signal processor (DSP). In some embodiments, the DSP is paired with a direct memory access (DMA) engine and two working memories so that processor execution on data in one memory can overlap DMA transfers to and from the other memory. Higher performance processors require more bandwidth than can be provided by a single working memory; additional bandwidth can be supplied by additional working memories. A synchronization mechanism is required to ensure than a given working memory is only in use by either the processor or the DMA at any given time, and to provide flow control of data passed between the processor and DMA engine.

In some embodiments, the processor 110 may be a DMA. The DMA takes care of large data transfers from an external memory to the processor internal memory and vice-versa, without using the CPU clock cycles. In some embodiments, the DMA is scalable and is suited to handle huge bandwidths without slowing down the CPU. To prevent the CPU from being idle during DMA, the processing is pipelined and staggered so that motion compensation is performed on an earlier block or data that is available, while DMA fetches the reference data for the current block. In some embodiments, several DMAs may be set up under an interrupt service routine (ISR) if necessary.

In accordance with some embodiments of the disclosure, the memory relocatable layer 108 includes a first memory space, a second memory space, and a third memory space. The first memory space contains several resident service programs, general purpose programs (or generic programs), or commonly-used programs. The second memory space contains an overlay physical region. The third memory space contains multiple overlay virtual regions, wherein each overlay virtual regions has corresponding application processes (programs) or application files, for example, the media programs, the video programs, the audio programs, or the image files, etc. In this embodiment, the overlay physical region is relocatable. That is, the memory addresses of the overlay virtual regions may be relocated (or mapped) to the same memory address of the overlay physical region by an overlay management system. In some embodiments, the overlay management system is a hardware system. For example, the memory addresses of the overlay virtual regions are hardwired to the corresponding one memory address of the overlay physical region. Therefore, the application processes in each overlay virtual regions may be directly moved or updated to the overlay physical region by processor 110 through these hardwires. In some embodiments, the corresponding application processes of the overlay virtual regions is determined to be executed by the PMA module. In some embodiments, the content of the accepted application processes of the selected overlay virtual region may be copied from the overlay virtual region to the overlay physical region by a processor 110.

Figure 2:
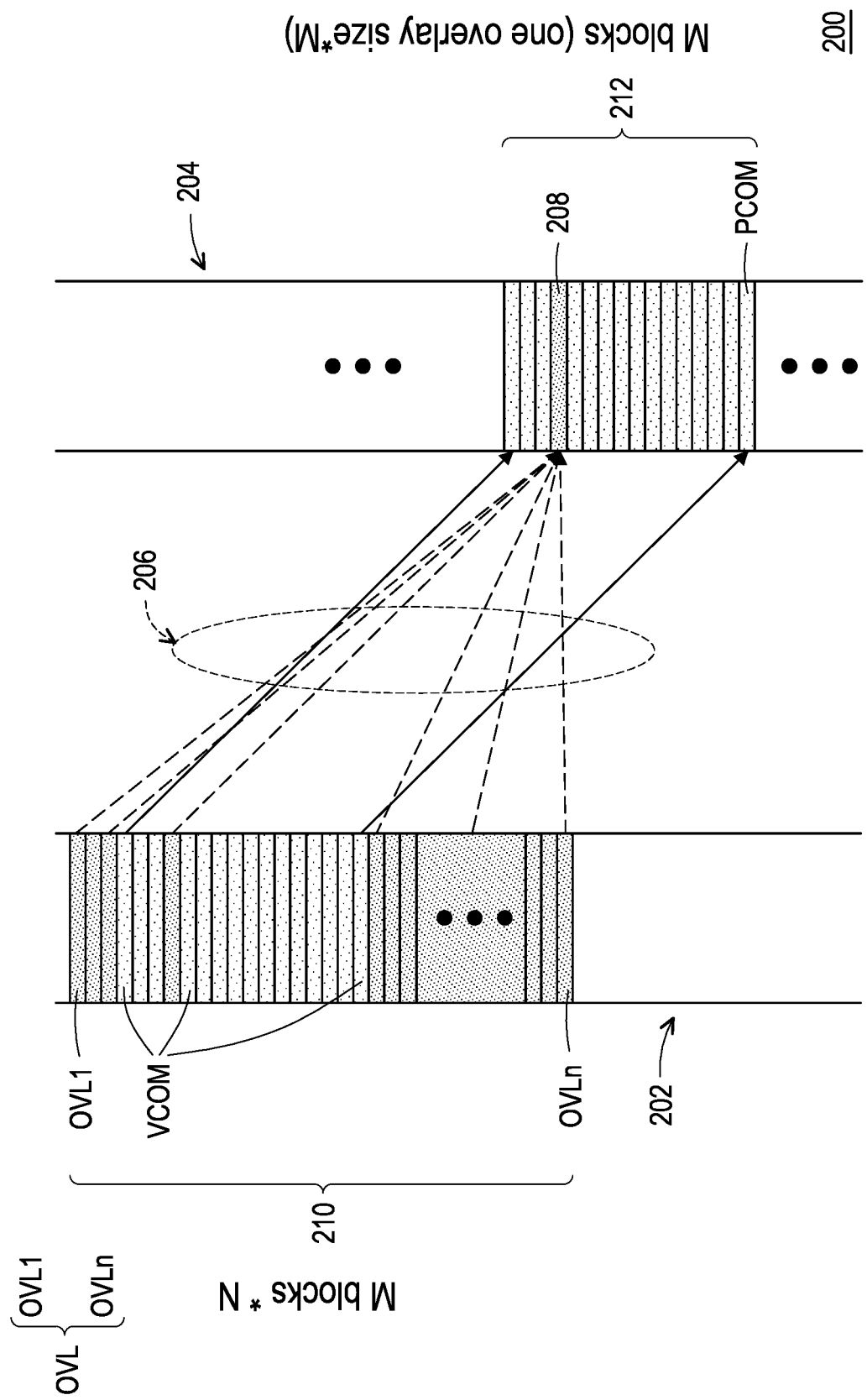
FIG. 2 illustrates a schematic diagram of memory mapping layer according to an embodiment of present disclosure.

FIG. 2 illustrates a schematic diagram of memory mapping layer according to an embodiment of present disclosure.

Referring to FIG. 2, the memory relocatable layer (or the memory mapping layer) 200 includes a virtual memory address domain (VMA) 202 and a load memory address domain (LMA) 204. In accordance with some embodiments of the disclosure, the VMA domain 202 includes an issued address space 210. In accordance with some embodiments of the disclosure, the LMA domain 204 includes an accepted address space 212. In some embodiments, a read only memory (ROM) may be applied to the VMA domain 202. In some embodiments, a random-access memory (RAM) may be applied to the LMA domain 204. For example, a static RAM (SRAM) or a dynamic RAM (DRAM) is applied to the LMA domain 204. In other words, the LMA domain 204 is constructed by hardware and the VMA domain 202 is a memory space seen by the software. In some embodiments, the issued address space 210 includes multiple overlay virtual regions OVL from the first overlay region OVL1 to the last overlay region OVLn and commonly-used virtual memory regions VCOM. In some embodiments, the addresses (or address numbers) of the overlay region OVL1 to the address of the last overlay region OVLn are continuous. In some embodiments, the addresses of the overlay region OVL1 to the address of the last overlay region OVLn are discontinuous. In some embodiments, the addresses of the overlay region OVL1 to the addresses of the last overlay region OVLn are predetermined or scheduled by the system hardware or system software. In some embodiments, the addresses of the overlay region OVL1 to the address of the last overlay region OVLn are randomly distributed.

In some embodiments, the commonly-used virtual memory regions VCOM contains memory-resident programs, resident service programs, general purpose programs (or generic programs), specific application programs, or commonly-used programs. For example, the memory-resident program has the ability to stay in the computer's memory after execution and to continuously run. In some embodiments, the addresses of the commonly-used virtual memory regions VCOM is continuous. In some embodiments, the addresses of the commonly-used virtual memory regions VCOM are discontinuous. In some embodiments, the addresses of the commonly-used virtual memory regions VCOM are predetermined or scheduled by the system hardware or system software. In some embodiments, the addresses of the commonly-used virtual memory regions VCOM are random distributed. In some embodiments, the content in the commonly-used virtual memory region VCOM is not allowed to use or move to the overlay virtual regions OVL. In other words, the commonly-used virtual memory region VCOM and the overlay virtual region OVL are mutually exclusive.

In accordance with some embodiments of the disclosure, the accepted address space 212 includes a commonly-used physical memory regions PCOM and an overlay physical region 208. In some embodiments, the accepted address space 212 includes only one overlay physical region 208. In some embodiments, the memory addresses of the overlay virtual regions OVL may be relocated (or mapped) 206 to the same memory address of the overlay physical region 208 by an overlay management system. In some embodiments, the overlay management system is a hardware system. For example, the memory addresses of the overlay virtual regions OVL are hardwired to the corresponding memory address of the overlay physical region 208. Therefore, the application processes in each overlay virtual regions OVL may be directly moved or updated to the overlay physical region 208 through these hardwires. In some embodiments, the corresponding application processes of the overlay virtual regions OVL are determined to be executed by the PMA module. In some embodiments, the PMA module decides which application processes of the overlay virtual regions OVL can be moved to the overlay physical region 208. In some embodiments, the content of the accepted application processes (determined by the PMA module) of the selected overlay virtual region OVL may be copied from the overlay virtual region OVL to the overlay physical region 208 by the processor, the DMA, or both the processor and the DMA.

In accordance with some embodiments of the disclosure, the overlay size of each of the overlay virtual regions OVL is equal to the overlay size of the overlay physical region 208. In some embodiments, each overlay size may be 4 KB or 16 KB. In some embodiments, the overlay size is not limited thereto. In some embodiments, the overlay size of each of the overlay virtual regions OVL may be the same as the size of each of the commonly-used virtual memory regions VCOM and each of the commonly-used physical memory regions PCOM. In alternative embodiments, the overlay size of each of the overlay virtual regions OVL may be different from the size of each of the commonly-used virtual memory regions VCOM and each of the commonly-used physical memory regions PCOM. In some embodiments, the content of the commonly-used virtual memory region VCOM cannot be moved to the overlay physical region 208 but only be moved to the corresponding commonly-used physical memory regions PCOM. In some embodiments, the address ordering of the commonly-used physical memory regions PCOM may not be the same as the address ordering of the commonly-used virtual memory regions VCOM after the relocating (or mapping) process 206.

In some embodiments, the memory size of the accepted address space 212 is related to the actual number of hardware connections (or hardwire number) of the SRAM. In some embodiments, the accepted address space 212 includes M memory blocks, wherein M is a positive integer and each memory block size is equal to one overlay size. That is, the memory size of the accepted address space 212 is M*(the overlay size). In some embodiments, the issued address space 210 includes M*N memory blocks, wherein N is a positive integer. For example, the accepted address space 212 is "16 overlay size", and the issued address space 210 is (16 overlay size)*8. It is noted that the memory block number of the commonly-used virtual memory regions VCOM and the commonly-used physical memory regions PCOM are the same (i.e., 15 overlay size) and will not be changed after the memory mapping 206. Therefore, the memory block number of the overlay virtual regions OVL is 113 (or 16*8−15) overlay size.

Figure 3:
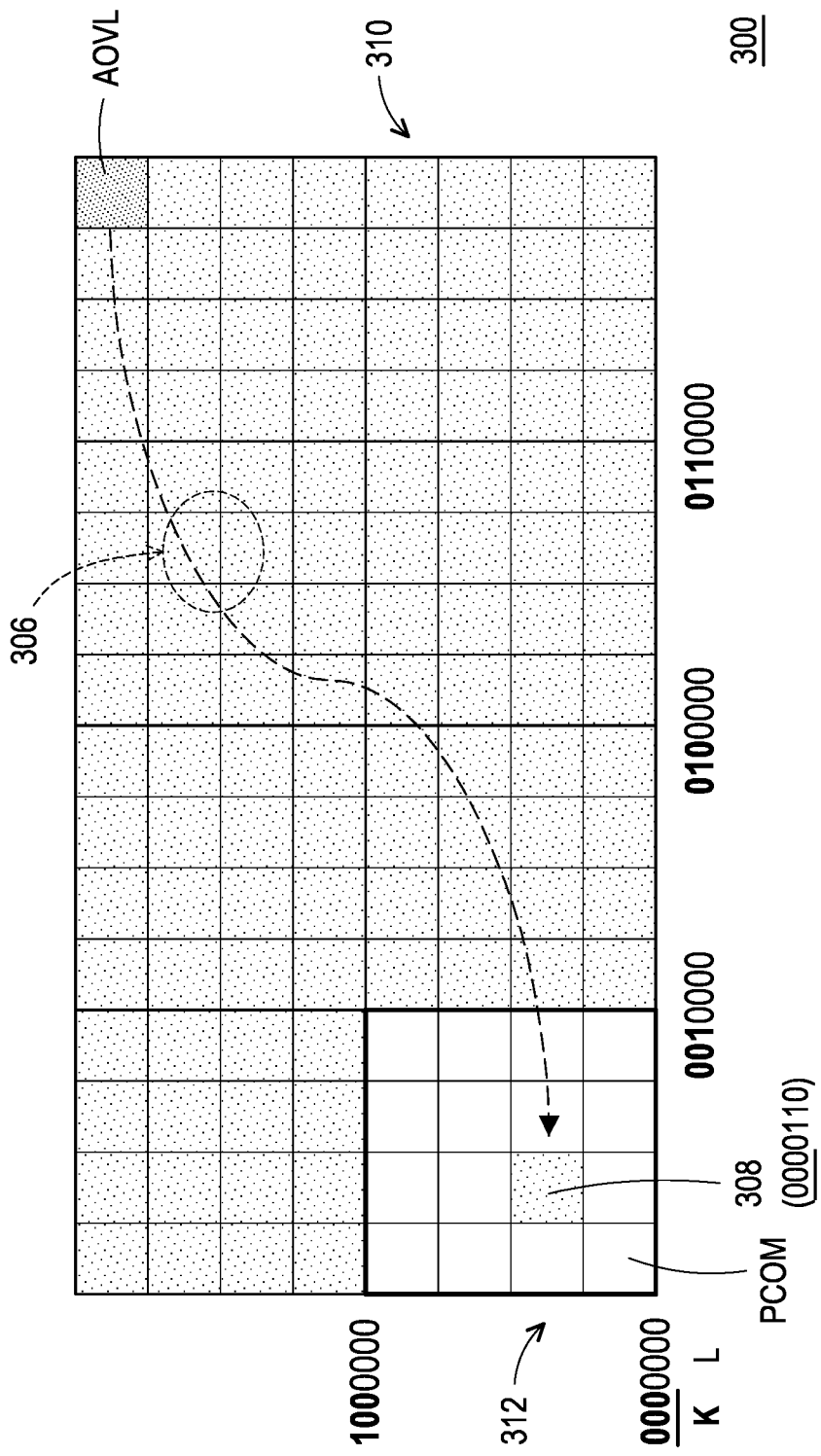
FIG. 3 illustrates another schematic diagram of memory mapping layer according to an embodiment of present disclosure.

FIG. 3 illustrates another schematic diagram of memory mapping according to an embodiment of present disclosure.

Referring to FIG. 2 and FIG. 3, in accordance with some embodiments of the disclosure, the memory relocatable layer (or the memory mapping layer) 300 includes an accepted address space 312 and an issued address space 310. In accordance with some embodiments of the disclosure, the accepted address space 312 includes a commonly-used physical memory regions PCOM and one overlay physical region 308. In some embodiments, the content of the commonly-used physical memory regions PCOM is related to the service routine process. In some embodiments, the overlay physical region 308 is a hard overlay identity (HOI) region. In some embodiments, the issued address space 310 is a hard overlay clone (HOC) region. That is, the issued address space 310 may be constructed by hardware. For example, the issued address space 310 (or overlay virtual regions) is constructed by a hardware overlay design. In other words, translating 306 the selected address of the active overlay region AOVL of the issued address space 310 (or overlay virtual regions) to match the address of the overlay physical region 308 is determined according to a fixed hardware connection pre-set by an overlay management system. For example, the hardwire connection may use pins, hardwires, or selectors, wherein the memory address translating may be controlled through a hardware parameter HOIsel. In some embodiments, the active overlay region AOVL is handled or determined by software. In some embodiments, the issued address space 310 may be applied to a read only memory (ROM). In some embodiments, the accepted address space 312 may be applied to a random-access memory. For example, the accepted address space 312 is applied to an SRAM or a DRAM.

In some embodiments, the accepted address space 312 is constructed by hardware system. The issued address space 310 is a memory space seen by the software. For example, the accepted address space 312 is a physical memory space of the hardware. In some embodiments, the memory address of the accepted address space 312 and the issued address space 310 are determined by the overlay management system through a lower four bits ([3:0]) parameter L (i.e., 0000, 0001, 0010, 0011, . . . , 1111) and a higher three bits ([6:4]) parameter K (i.e., 000, 001, 010, 011, . . . , 111). In this embodiment, K and L are non-negative number (i.e., K=3, L=4). That is, the memory address may be 7-bit long (represented in 2-base or binary-base). For example, the address of the matched overlay physical region 308 is 0000110. The lower four bits parameter L can be used to represent the relocatable memory address of the overlay physical region 308 and the addresses of the commonly-used physical memory regions PCOM. The higher four bits parameter K can be used to represent the multiple issued address spaces 310 cloned by the hardware. In this case, the number of the issued address spaces 310 seen by the software is "8" (or $2^3$). It is noted that the cloned memory space does not include the commonly-used physical memory regions PCOM and the overlay physical region 308. In addition, a configurable memory size including the issued address spaces 310 and the accepted address space 312 of the memory relocatable layer is (an overlay size)*$2^{K+L}$. The configurable memory size is less than or equal to the addressable memory size of the memory relocatable layer 300. In some embodiments, a maximum number of overlay space including the overlay physical region 308 and the issued address spaces 310 (overlay virtual regions) is ($2^K$−1)*$2^L$+1. In this embodiment, for example, K and L are non-negative number (i.e., K=3, L=4), therefore the maximum number of overlay space is "113" (or 113 overlays). The number of the commonly-used physical memory regions PCOM is ($2^L$−1), i.e., 15 overlays. In other words, a size of the resident service processes is ($2^L$−4)*(an overlay size). It is noted that a number of overlay space actually used by the system is controlled and determined by the overlay application layer through the interface layer and a user interface. For example, the overlay size actually used by the system is flexibly controlled by the PMA module, the PMP module, or an embedded PMP module according to system requirements. In some embodiments, the issued address spaces 310 (overlay virtual regions) is easily emulated and controlled by the overlay management system (a hardware system or a software system). In some embodiments, the overlay management system may be implemented in a local memory space of the processor (CPU local memory, a distributed lock manager (DLM), a system high-performance SRAM space, and a system main memory (DRAM) space.

In some embodiments, the overlay management system is able to use the hardware parameter HOIsel to translate and select the memory address by using the hardware instructions. For example, the hardware instructions "OvPindex= ((OvVindex [6:4]−3'b0)? OvVindex [3:0]: HOIsel [3:0]);" is used to control the hardwire connection and determine how to move the content of the active overlay region AOVL to the selected the address of the overlay physical region 308 (or the hard overlay identity (HOI) region). For example, the hardware instructions "HOIsel [3:0]" is used to determine one of the 16 regions (addresses) from the accepted address space 312 and update the content from the active overlay region AOVL to the overlay physical region 308. That is, the content of "OvPindex" will be the updated. The hardware instructions "(OvVindex [6:4]−3'b0)" is used to determine whether one of the issued address spaces 310 (overlay virtual regions) meets the overlay (memory) swapping requirement (i.e., the corresponding parameter K is "000") that is able to be mapped or switched to the accepted address space 312. If the overlay (memory) swapping requirement is not allowed by PMA, the physical memory space "OvPindex" will not be updated and maintain at the original memory address of the virtual memory space "OvVindex [3:0]".

In some embodiments, the commonly-used physical memory regions PCOM contains memory-resident programs, resident service programs, general purpose programs (or generic programs), specific application programs, or commonly-used programs. For example, the memory-resident program has the ability to stay in the computer's memory after execution and to continuously run. In some embodiments, the addresses of the commonly-used physical memory regions PCOM is continuous. In some embodiments, the addresses of the commonly-used physical memory regions PCOM are discontinuous. In some embodiments, the addresses of the commonly-used physical memory regions PCOM are predetermined or scheduled by the system hardware or system software. In some embodiments, the addresses of the commonly-used physical memory regions PCOM are random distributed. In some embodiments, the content in the commonly-used physical memory regions PCOM is not allowed to use or move to the active overlay region AOVL. In other words, the commonly-used physical memory regions PCOM and the active overlay region AOVL are mutually exclusive.

In accordance with some embodiments of the disclosure, the accepted address space 312 includes a commonly-used physical memory regions PCOM and an overlay physical region 308. In some embodiments, the accepted address space 312 includes only one overlay physical region 308. In some embodiments, the overlay physical region 308 may be relocated (or mapped) 306 to the pre-determined memory address of the overlay physical region 308 by the overlay management system. In some embodiments, the overlay management system is a hardware system. For example, the memory addresses of the active overlay region AOVL are hardwired to the corresponding memory address of the overlay physical region 308. Therefore, the application processes in the selected issued address space 310 (for example, the active overlay region AOVL) may be directly moved or updated to the overlay physical region 308 through these hardwires. In some embodiments, the corresponding application processes of the active overlay region AOVL are determined to be executed by the PMA module. In some embodiments, the PMA module decides which application processes of the active overlay region AOVL can be moved to the overlay physical region 308. In some embodiments, the content of the accepted application processes (determined by the PMA module) of the selected active overlay region AOVL may be copied from the active overlay region AOVL to the overlay physical region 308 by the processor, the DMA, or both the processor and the DMA.

In some embodiments, each address of issued address space 310 is determined according to an address information stored in an address register. The address information is adjusted by an overlay relocating (translating) process when the application process is under execution.

In accordance with some embodiments of the disclosure, the overlay size of each of the issued address spaces 310 is equal to the overlay size of the overlay physical region 308. In some embodiments, each overlay size may be 4 KB, 16 KB, or 5 MB. In some embodiments, the overlay size is not limited thereto. In some embodiments, the overlay size of each of the issued address spaces 310 may be the same as the size of each of the commonly-used physical memory regions PCOM and each of the commonly-used physical memory regions PCOM. In alternative embodiments, the overlay size of each of the issued address spaces 310 may be different from the size of each of the commonly-used physical memory regions PCOM. In some embodiments, the content of the issued address spaces 310 cannot be moved to the overlay physical region 308 but only be moved to the corresponding commonly-used physical memory regions PCOM. In some embodiments, the address ordering of the commonly-used physical memory regions PCOM may not be the same as the address ordering of the issued address spaces 310 after the relocating (or mapping, translating) process 306.

Figure 4:
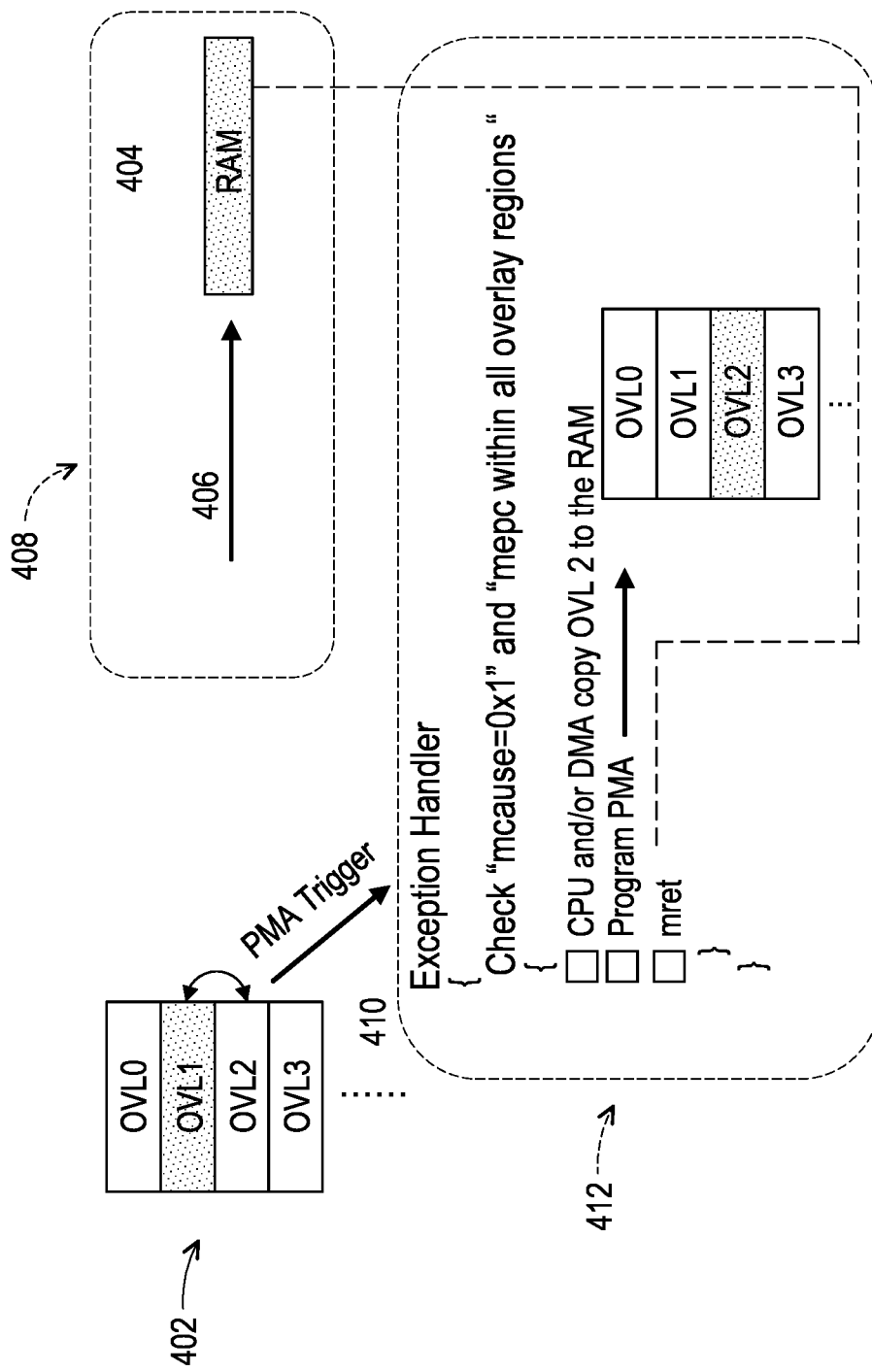
FIG. 4 illustrates a schematic diagram of an overlay swapping process with PMA, Exception Handler, and address translating hardware according to an embodiment of present disclosure.

FIG. 4 illustrates a schematic diagram of an overlay swapping process with PMA, Exception Handler, and address translating hardware according to an embodiment of present disclosure.

Referring to FIG. 4, in accordance with some embodiments of the disclosure, the overlay swapping process architecture 400 includes a data layer 402, an overlay application layer 412, and a memory relocatable layer 408.

In accordance with some embodiments of the disclosure, the data layer 402 may includes multiple overlay regions OVL0, OVL1, OVL2, OVL3. The overlay number is not limited thereto.

In accordance with some embodiments of the disclosure, the overlay application layer 412 includes an exception handler program (software). In some embodiments, the exception handler program is used to check if an overlay exception has occurred after receiving an information signal (i.e., the first signal). The overlay exception occurs when the overlay region is going to be switched. For example, when the first overlay region OVL1 is about to switch to the second overlay region OVL2, the data layer will issue the information signal to trigger the PMA module 410. Once the PMA module is triggered, the execution process shifts to the overlay application layer 412 to execute the exception handler program.

In accordance with some embodiments of the disclosure, the exception handler program performs two judgement commands "mcause=0x1" and "mepc within all overlay regions" to check the exception. The judgement command "mcause=0x1" stands for "instruction access fault", which is used to determine whether such exception is a system anomaly caused by overlay swapping. The judgement command "mepc within all overlay regions" stands for "faulting instruction", which is used to check whether the overlay region to be switched has the "mepc" instruction.

In this embodiment, the CSR address of the "mcause" instruction is 0x342, and the CSR address of the "mepc" instruction is 0x341. In some embodiments, the "mcause" may be a machine cause register. The "mcause" register is an XLEN-bit read-write register. When a trap is taken into M-mode, "mcause" is written with a code indicating the event that caused the trap. Otherwise, "mcause" is never written by the implementation, though it may be explicitly written by software. The Interrupt bit in the "mcause" register is set if the trap was caused by an interrupt. The Exception Code field contains a code identifying the last exception.

In some embodiments, the "mepc" may be a machine exception program counter. The "mepc" is an XLEN-bit read/write register. The low bit of mepc (mepc[0]) is always zero. On implementations that do not support instruction-set extensions with 16-bit instruction alignment, the two low bits (mepc[1:0]) are always zero. In some embodiments, "mepc" is a write any values, reads legal values (WARL) register that must be able to hold all valid physical and virtual addresses. It need not be capable of holding all possible invalid addresses. Implementations may convert some invalid address patterns into other invalid addresses prior to writing them to "mepc". When a trap is taken into M-mode, "mepc" is written with the virtual address of the instruction that encountered the exception. Otherwise, "mepc" is never written by the implementation, though it may be explicitly written by software. In some embodiments, the "mepc" may be a register written with the virtual address of the instruction that encountered traps and/or on-maskable interrupts (NMIs) when these events occurred.

According to the RISC-V Privileged Architecture, a trap is a control flow change of normal instruction execution caused by an interrupt or an exception. An interrupt is initiated by an external source, while an exception is generated as a by-product of instruction execution. When a trap happens, the processor stops processing the current flow of instructions, disables interrupts, saves enough states for later resumption, and starts executing a trap handler.

In accordance with some embodiments of the disclosure, interrupts can be local or external. The external interrupts are global interrupts that are arbitrated externally by a platform level interrupt controller (PLIC) and the selected external interrupt joins the rest of local interrupts for arbitration to take a trap.

In accordance with some embodiments of the disclosure, exceptions or interrupts can be precise or imprecise. The instruction causing precise exceptions and all its subsequent instructions in the program order will not have affected the architectural state when precise exceptions are triggered. Furthermore, the events that cause these precise exceptions have to be precisely attributed to the causing instruction. The value of "mcause" register will be greater than zero for precise exceptions. Exceptions not meeting these criteria can only be imprecise and they are delivered as local interrupts ("mcause" <0) instead. That is, the standard RISC-V privileged architecture exceptions are only triggered for precise exceptions, and local interrupts are triggered for imprecise exceptions.

In accordance with some embodiments of the disclosure, for precise exceptions, "mepc" is the PC of the faulting instruction. For imprecise exceptions, "mepc" is pointing to the interrupted instruction. Regardless of preciseness of exceptions, "mtval" records the effective faulting information for exceptions related to memory operations. In accordance with some embodiments of the disclosure, when a trap occurs, "mepc" is set to the current program counter before jumping exception. In some embodiments, the "mepc" register is written with the address of the next instruction when the NMIs was taken. In some embodiments, NMIs are intended for handling hardware error conditions and are assumed to be non-resumable. They are triggered through the NMI input signal.

In some embodiments, when the exception handler accepted the request for overlay swapping, the PMA will be executed to allow the content of the second overlay region OVL2 to be moved or updated to the RAM 404 and close the overlay regions OVL0, OVL1, and OVL3. For example, the second overlay region OVL2 may be copied and moved to the physical DRAM or SRAM by the CPU or DMA through address translation process 406. The address translation process 406 can be easily known by referring to the embodiments mentioned above, and no more repeated description here. In some embodiments, when the CPU schedules are busy, the overlay region OVL2 can be moved by DMA, otherwise, directly move the second overlay region OVL2 by CPU.

In some embodiments, the memory system executed the "mret" instruction and jump to the RAM 404 to execute the application programs of the second overlay region OVL2.

Figure 5:
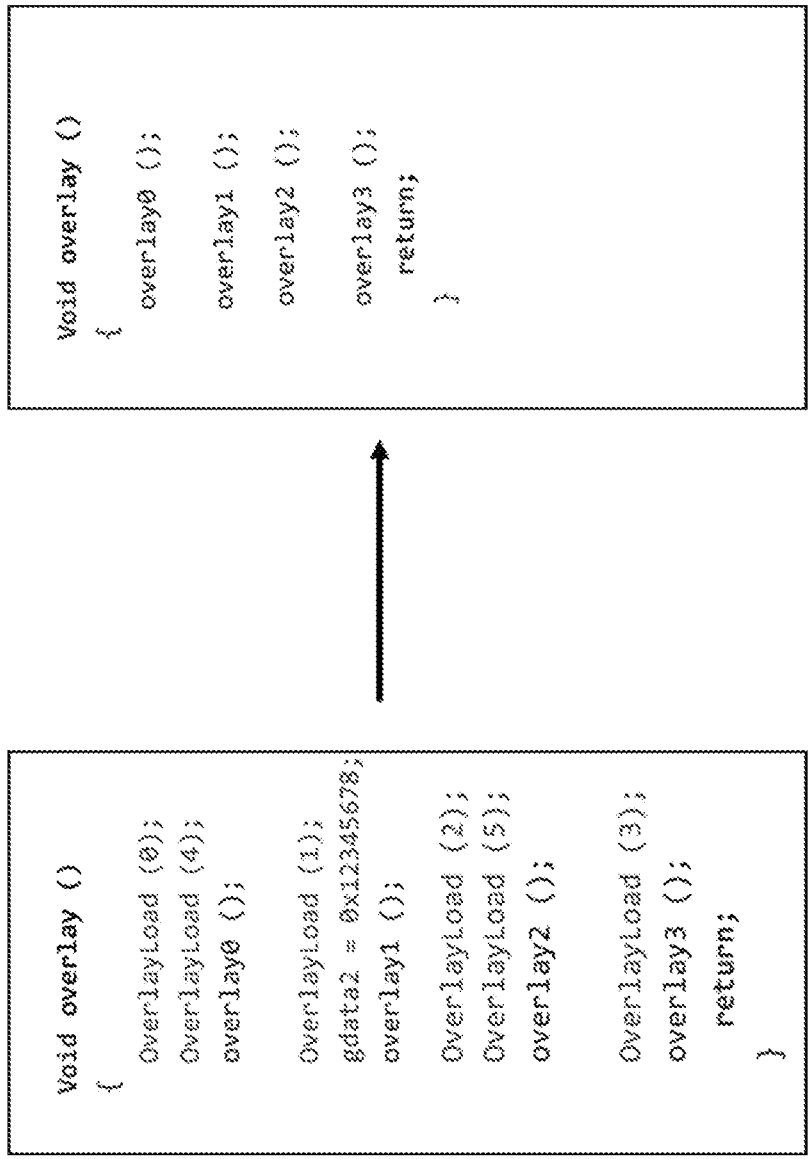
FIG. 5 illustrates a schematic diagram of the original program and the program reduction by memory managing method according to the embodiment of present disclosure.

FIG. 5 illustrates a schematic diagram of the original program and the program reduction by memory managing method according to the embodiment of present disclosure.

Referring to FIG. 5, by using the memory managing method according to the embodiment of present disclosure, there is no need to set the parameter "OverlayLoad" and the corresponding address (e.g., gdata2=0x12345678) of the accepted overlay region every time. In other words, the address translation setting of the hardware connection reduces considerable time in writing code about memory space configuration.

FIG. 6 illustrates a schematic diagram of the program of the Exception Handler according to the embodiment of present disclosure.

Referring to FIG. 6, in accordance with some embodiments of the disclosure, the configurable memory system executes the loop control random swapping programs to test the output results. When the memory system jumps to the trap, it means the memory system enters the exception handler area. Therefore, the memory system will be triggered by the PMA module and display the execution result of related parameters "mcause" and "mepc". For example, when the Unhandled Trap shows: mcause=0x1, mepc=0x10000, then enter overlay0 function. For another example, when the Unhandled Trap shows: mcause=0x1, mepc=0x11000, then enter overlay0 function switched to the overlay1 function. For still another example, when the Unhandled Trap shows: mcause=0x1, mepc=0x13000, then enter overlay1 function switched to the overlay3 function. It is noted that if there is no switching event occurred, there will be no related messages of "mcause" and "mepc". Other examples can be easily known by referring to the embodiments mentioned above, and no more repeated description here.

Figure 7:
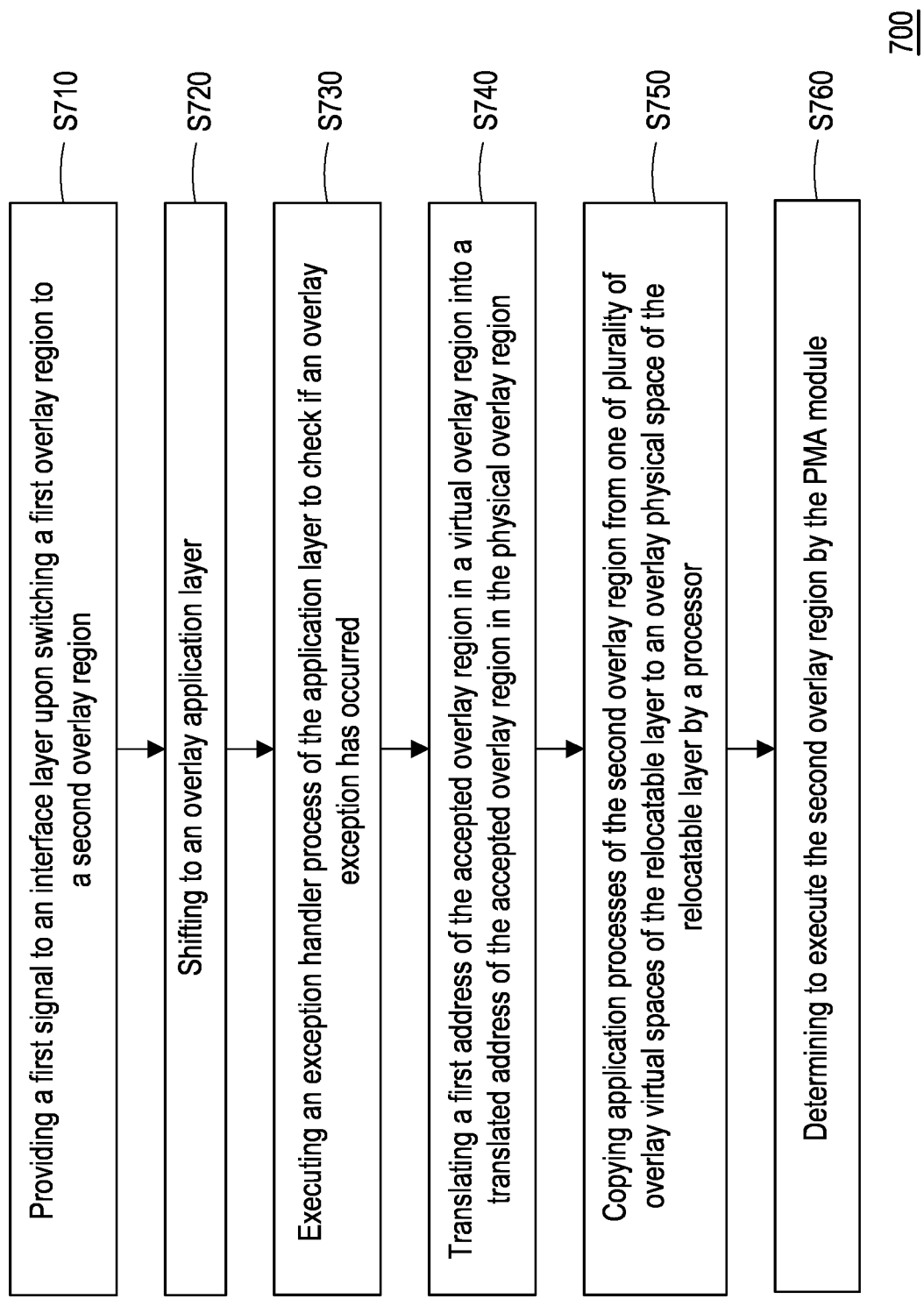
FIG. 7 illustrate a flow chart of the memory management method according to an embodiment of present disclosure.

FIG. 7 illustrate a flow chart of the memory management method according to an embodiment of present disclosure.

Referring to FIG. 7, in step S710, the data layer provides a first signal to an interface layer upon switching a first overlay region to a second overlay region.

In step S720, the present process of the memory system shifts to an overlay application layer.

In step S730, the memory system executes an exception handler process of the application layer to check if an overlay exception has occurred.

In step S740, the overlay management system translates a first address of the accepted overlay region in a virtual overlay region into a translated address of the second overlay region in the physical overlay region.

In step S750, the processor (CPU or DMA) copies the application processes of the accepted overlay region from one of the overlay virtual spaces of the relocatable layer to an overlay physical space of the relocatable layer.

In step S760, the PMA module is programmed and determines to execute the accepted overlay region.

In accordance with some embodiments of the disclosure, the invention provides a configurable memory system including an interface layer, an overlay application layer, and a memory relocatable layer. The interface layer has a physical memory attribute module and a physical memory protection module. The interface layer manages memory attributes and memory security. The overlay application layer is coupled to the interface layer and executes an exception handler process to check if an overlay exception has occurred. The memory relocatable layer, coupled to the interface layer and the overlay application layer, having a plurality of resident service program within a first memory space, an overlay physical region within a second memory space, and a plurality of overlay virtual regions having application processes within a third memory space. The application processes of one of the overlay virtual regions is determined to be executed by the PMA module and is copied from the overlay virtual region to the overlay physical region by a processor.

In some embodiments, translating each of the addresses of the plurality of overlay virtual regions is determined according to a fixed hard wire connection pre-set by an overlay management system.

In some embodiments, each of the addresses of the plurality of overlay virtual regions is determined according to an address information stored in an address register, wherein the address information is adjusted by an overlay relocating process when the application process is under execution.

In some embodiments, a memory size of the first memory space, a memory size of the second memory space, and a memory size of the third memory space are determined according to an overlay management system.

In some embodiments, a memory size of the first memory space, a memory size of the second memory space, and a memory size of the third memory space is determined according to a corresponding memory size information stored in a corresponding memory size register, wherein the memory size information is adjusted by an overlay relocating process when the application processes are under execution.

In some embodiments, configurable memory size of the memory relocatable layer is $2^{K+L}*$(an overlay size), wherein the configurable memory size is less than or equal to an addressable memory size of the memory relocatable layer.

In some embodiments, a maximum number of overlay space comprising the overlay physical region and the plurality of overlay virtual regions is $(2^K-1)*2^L+1$.

In some embodiments, a number of overlay space actually used by the system is controlled and determined by the overlay application layer through the interface layer and a user interface.

In some embodiments, a size of the plurality of resident service processes is $(2^L-1)*$(an overlay size).

In some embodiments, the overlay size actually used by the system is flexibly controlled by the PMA module, the PMP module, or an embedded PMP module according to system requirements.

In some embodiments, the memory system is implemented in a local memory space of the processor, a SRAM space, and a main memory space.

In some embodiments, the overlay physical region is adapted for either an instruction memory or a data memory.

In some embodiments, the memory system is not influenced by operation mechanism of cache, and wherein the memory system is either implemented independently or with cache.

In some embodiments, the memory system uses either a single privilege mode of the processor or a plurality of privilege modes of the processor to execute privilege instructions.

In some embodiments, the interface layer uses configurations and address registers of the PMA module, the PMP module, or an embedded PMP module of RISC-V architecture, wherein the interface layer uses a trap and exception mechanism of RISC-V architecture.

In alternative embodiments, the interface layer uses configurations and address registers of the PMA module, the PMP module, or an embedded PMP module of ARM architecture, wherein the interface layer uses a trap and exception mechanism of ARM architecture.

In some embodiments, the PMA module of RISC-V uses a memory type attribute (MTYP) to define the cacheability and idempotency of memory regions, wherein a type 15 of the MTYP is defined as an empty hole which is designed to trigger an overlay swapping by a predetermined instruction sets comprising an instruction access fault, a load access fault, and a store access fault.

In some embodiments, the application layer implements a plurality of management application programming interfaces (APIs) related to the overlay exception in the exception handler process.

In some embodiments, when the exception handler process determines to execute an overlay swapping, the processor controls a direct memory access (DMA) controller of the memory system to update the application process in the overlay virtual region and to move updated application process into the overlay physical region, or the processor directly updates the application process in the overlay virtual region and moves updated application process into the overlay physical region.

In accordance with another embodiment of the disclosure, the present disclosure provides a memory managing method. The memory managing method includes: providing a first signal to an interface layer upon switching a first overlay region to a second overlay region, shifting to an overlay application layer, executing an exception handler process of the application layer to check if an overlay exception has occurred, translating a first address of the second overlay region in a memory relocatable layer into a second address, copying application processes of the second overlay region from one of plurality of overlay virtual regions of the memory relocatable layer to an overlay physical region of the memory relocatable layer by a processor, and determining to execute the second overlay region by the PMA module. The interface layer includes a physical memory attribute (PMA) module and a physical memory protection (PMP) module. The interface layer is responsible for managing a plurality of memory attributes and memory security. The overlay physical region accommodates one overlay size at a time. The overlay physical region receives the application processes from one overlay virtual region at a time.

In some embodiments, translating the first address into the second address is determined according to a fixed hard wire connection pre-set by an overlay management system or according to an address information stored in an address register, wherein the address information is adjusted by an overlay relocating process when the application process is under execution.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A configurable memory system, comprising:
   an interface layer, having a physical memory attribute (PMA) module and a physical memory protection (PMP) module, managing a plurality of memory attributes and memory security;
   an overlay application layer, coupled to the interface layer and executing an exception handler process to check if an overlay exception has occurred; and
   a memory relocatable layer, coupled to the interface layer and the overlay application layer, having a plurality of resident service program within a first memory space, an overlay physical region within a second memory space, and a plurality of overlay virtual regions having corresponding application processes within a third memory space,
   wherein the corresponding application processes of one of plurality of overlay virtual regions is determined to be executed by the PMA module and is copied from the overlay virtual region to the overlay physical region by a processor.

2. The memory system as claimed in claim 1, wherein translating each of the addresses of the plurality of overlay virtual regions is determined according to a fixed hardwire connection pre-set by an overlay management system.

3. The memory system as claimed in claim 1, wherein each of the addresses of the plurality of overlay virtual regions is determined according to an address information stored in an address register, wherein the address information is adjusted by an overlay relocating process when the application process is under execution.

4. The memory system as claimed in claim 1, wherein a memory size of the first memory space, a memory size of the second memory space, and a memory size of the third memory space are determined according to an overlay management system.

5. The memory system as claimed in claim 1, wherein a memory size of the first memory space, a memory size of the second memory space, and a memory size of the third memory space are determined according to a corresponding memory size information stored in a corresponding memory size register, wherein the memory size information is adjusted by an overlay relocating process when the application processes are under execution.

6. The memory system as claimed in claim 1, wherein a configurable memory size of the memory relocatable layer is $2^{K+L}*$(an overlay size), wherein the configurable memory size is less than or equal to an addressable memory size of the memory relocatable layer.

7. The memory system as claimed in claim 1, wherein a maximum number of overlay space comprising the overlay physical region and the plurality of overlay virtual regions is $(2^K-1)*2^L+1$.

8. The memory system as claimed in claim 7, wherein a number of overlay space actually used by the system is controlled and determined by the overlay application layer through the interface layer and a user interface.

9. The memory system as claimed in claim 1, wherein a size of the plurality of resident service processes is $(2^L-1)$ *(an overlay size).

10. The memory system as claimed in claim 9, wherein the overlay size actually used by the system is flexibly controlled by the PMA module, the PMP module, or an embedded PMP module according to system requirements.

11. The memory system as claimed in claim 1, wherein an overlay management system is implemented in a local memory space of the processor, a SRAM space, and a main memory space.

12. The memory system as claimed in claim 1, wherein the overlay physical region is adapted for either an instruction memory or a data memory.

13. The memory system as claimed in claim 1, wherein the memory system is not influenced by operation mechanism of cache, and wherein the memory system is either implemented independently or with cache.

14. The memory system as claimed in claim 1, wherein the memory system uses either a single privilege mode of the processor or a plurality of privilege modes of the processor to execute privilege instructions.

15. The memory system as claimed in claim 1, wherein the interface layer uses configurations and address registers of the PMA module, the PMP module, or an embedded PMP module of RISC-V/ARM architecture, wherein the interface layer uses a trap and exception mechanism of RISC-V/ARM architecture.

16. The memory system as claimed in claim 15, wherein the PMA module of RISC-V uses a memory type attribute (MTYP) to define the cacheability and idempotency of memory regions, wherein a type 15 of the MTYP is defined as an empty hole which is designed to trigger an overlay swapping by a predetermined instruction sets comprising an instruction access fault, a load access fault, and a store access fault.

17. The memory system as claimed in claim 1, wherein the application layer implements a plurality of management application programming interfaces (APIs) related to the overlay exception in the exception handler process.

18. The memory system as claimed in claim 1, wherein when the exception handler process determines to execute an overlay swapping, the processor controls a direct memory access (DMA) controller of the memory system to update the application process in the overlay virtual region and to move updated application process into the overlay physical region, or the processor directly updates the application process in the overlay virtual region and moves updated application process into the overlay physical region.

19. A memory managing method, comprising:
   providing a first signal to an interface layer upon switching a first overlay region to a second overlay region, wherein the interface layer comprises a physical memory attribute (PMA) module and a physical memory protection (PMP) module and is responsible for managing a plurality of memory attributes and memory security;
   shifting to an overlay application layer;
   executing an exception handler process of the application layer to check if an overlay exception has occurred;
   translating a first address of the second overlay region in a memory relocatable layer into a second address of the second overlay region;
   copying application processes of the second overlay region from one of plurality of overlay virtual regions of the memory relocatable layer to an overlay physical region of the memory relocatable layer by a processor; and
   determining to execute the second overlay region by the PMA module,
   wherein the overlay physical region receives the application processes from one overlay virtual region at a time.

20. The method as claimed in claim 19, wherein translating the first address into the second address is determined according to a fixed hard wire connection pre-set by an overlay management system or according to an address information stored in an address register, wherein the address information is adjusted by an overlay relocating process when the application process is under execution.

\* \* \* \* \*